(12) United States Patent
Naven et al.

(10) Patent No.: US 9,742,671 B2
(45) Date of Patent: Aug. 22, 2017

(54) SWITCHING METHOD

(71) Applicant: Micron Technology, Inc., Boise, ID (US)

(72) Inventors: Finbar Naven, Cheshire (GB); Mark Piekarski, Cheshire (GB)

(73) Assignee: MICRON TECHNOLOGY, INC., Boise, ID (US)

( * ) Notice: Subject to any disclaimer, the term of this patent is extended or adjusted under 35 U.S.C. 154(b) by 31 days.

(21) Appl. No.: 14/295,930

(22) Filed: Jun. 4, 2014

(65) Prior Publication Data

US 2014/0286350 A1     Sep. 25, 2014

Related U.S. Application Data

(63) Continuation of application No. 12/609,930, filed on Oct. 30, 2009, now Pat. No. 8,774,055.

(30) Foreign Application Priority Data

Sep. 22, 2009 (GB) .................................. 0916653.9

(51) Int. Cl.
*H04L 12/741* (2013.01)
*H04L 12/863* (2013.01)
(Continued)

(52) U.S. Cl.
CPC ............ *H04L 45/74* (2013.01); *G06F 13/404* (2013.01); *G06F 13/4063* (2013.01);
(Continued)

(58) Field of Classification Search
None
See application file for complete search history.

(56) References Cited

U.S. PATENT DOCUMENTS 7,127,524 B1 * 10/2006 Renda ..................... H04L 29/12
                                                          709/223
7,293,129 B2 * 11/2007 Johnsen et al. ............... 710/313
(Continued)

FOREIGN PATENT DOCUMENTS

WO     2009/123627     10/2000
WO     2009/120798     10/2009

OTHER PUBLICATIONS

Budruk, Ravi et al., PCI express system architecture, Mindshare, Inc., excerpt from Chapter 20, 2004.*
(Continued)

*Primary Examiner* — Faruk Hamza
*Assistant Examiner* — Cassandra Decker
(74) *Attorney, Agent, or Firm* — McDonnell Boehnen Hulbert & Berghoff LLP

(57) ABSTRACT

A method for providing identifiers for virtual devices in a network. The method comprises receiving a discovery data packet directed to a physical network node associated with a physical endpoint device. A response to the discovery data packet directed to a physical network node is provided, the response comprising an identifier of a virtual device. At least one further discovery data packet directed at least to said virtual device is received. A response to a first one of the further discovery data packets is provided, the response comprising an identifier of a virtual endpoint device. At least some functionality of the virtual endpoint device is provided by the physical endpoint device.

20 Claims, 8 Drawing Sheets

(51) Int. Cl.
*G06F 13/40* (2006.01)
*H04L 12/931* (2013.01)
*G06F 9/455* (2006.01)

(52) U.S. Cl.
CPC .............. *H04L 47/62* (2013.01); *H04L 49/70* (2013.01); *G06F 9/45558* (2013.01)

(56) References Cited

U.S. PATENT DOCUMENTS

| | | | | |
|---|---|---|---|---|
| 7,397,794 | B1 * | 7/2008 | Lacroute | ................. H04L 49/10 370/367 |
| 7,620,955 | B1 * | 11/2009 | Nelson | ................. G06F 9/45533 703/26 |
| 8,255,496 | B2 * | 8/2012 | Shukla | ................. H04L 49/70 709/220 |
| 2002/0186698 | A1 * | 12/2002 | Ceniza | ................. H04L 12/4641 370/401 |
| 2003/0055978 | A1 * | 3/2003 | Collins | ................... H04L 29/06 709/227 |
| 2004/0024882 | A1 * | 2/2004 | Austin | ................ H04L 12/2856 709/227 |
| 2005/0152368 | A1 * | 7/2005 | Liu | ................... H04L 29/12009 370/392 |
| 2006/0242330 | A1 | 10/2006 | Torudbakken et al. | |
| 2007/0208898 | A1 | 9/2007 | Pettey et al. | |
| 2008/0040526 | A1 | 2/2008 | Suzuki et al. | |
| 2008/0288661 | A1 * | 11/2008 | Galles | ............................... 710/3 |
| 2011/0010483 | A1 * | 1/2011 | Liljeberg | ............ G06F 12/1441 711/6 |

OTHER PUBLICATIONS

UKIPO Search Report mailed on Jan. 14, 2010, issued in connection with Application No. GB0916653.9, 7 pages.

* cited by examiner

| | I/O Device 5 | Device queue |
|---|---|---|
| Virtual I/O Device 38 | 1 | QUEUE0 |
| Virtual I/O Device 41 | 1 | QUEUE1 |
| Virtual I/O Device 44 | 1 | QUEUE2 |

← 45

| | I/O Device A | Device queue | I/O Device B | Device queue |
|---|---|---|---|---|
| Virtual I/O Device X | 0 | N/A | 1 | QUEUE0 |
| Virtual I/O Device Y | 0 | N/A | 1 | QUEUE1 |
| Virtual I/O Device Z | 1 | QUEUE0 | 0 | N/A |

← 45

SWITCHING METHOD

The present invention relates to systems and methods for providing identifiers for virtual devices in a network.

CROSS-REFERENCE TO RELATED APPLICATIONS

This application claims priority to U.S. patent application Ser. No. 12/609,930, filed Oct. 30, 2009, which is hereby incorporated by reference in its entirety.

BACKGROUND

It is often necessary to send data between devices in a computer system, for example it is often necessary to connect a processing device to a plurality of input and output devices. Appropriate data communication is achieved by connecting the devices in such a way as to allow them to send data to each other over a physical link, which may be a wired link or a wireless link.

It is known in the art to use a switch to route data packets from the outputs of one or more devices to inputs of one or more other devices. Such a switch comprises one or more ingress ports arranged to allow the data packets to be received by the switch, and a plurality of egress ports arranged to allow the data to be transmitted from the switch.

SUMMARY

Many conventional computer systems do not share input/output (I/O) devices. That is, each computer has its own dedicated I/O devices. It is, however, advantageous to allow the sharing of I/O devices such that a plurality of computers can access one or more shared I/O devices. Sharing of I/O devices can lead to better resource utilisation, scalability, ease of upgrade, and improved reliability.

Sharing of I/O devices can be implemented using what is known as I/O virtualization. I/O Virtualization allows physical resources (e.g. memory) associated with a particular I/O device to be shared by a plurality of computers. One application of I/O virtualization, known as single root I/O virtualisation (SR IOV), allows I/O devices on a single computer to be shared by multiple operating systems running concurrently on that computer.

Current methods of sharing I/O devices between multiple operating systems generally require either modification to software running on the server, modified or new I/O devices, or both, in order to implement I/O virtualisation.

For example, some PCI express devices can provide up to eight individually addressable functions within the same device. In this way, particular operating systems executing concurrently on a computer can be arranged to access a particular function provided by the device, thereby allowing the device to be shared amongst the multiple operating systems. This requires the purchase and installation of devices which support the provision of multiple functions, and additionally requires an awareness that the I/O device is being shared by software running on the computer.

Alternatively, intermediary software, sometimes known as a virtual machine manager, may be run on a server. The virtual machine manager can co-ordinate accesses, by multiple operating systems running concurrently on the server, to physical resources connected to the server. In this way, operation of one operating system does not affect operation of any other operating system with which it shares physical resources such as I/O devices. Co-ordinating every access to a physical resource for a plurality of operating systems is a computationally expensive operation such that the performance of the server and the operating systems running on the server can be negatively affected.

Various embodiments of the systems and methods described herein obviate or mitigate one or more of the problems outlined above.

According to a first aspect of an embodiment, there is provided a method for providing identifiers for virtual devices in a network, the method comprising: receiving a discovery data packet directed to a physical network node associated with a physical endpoint device; responding to the discovery data packet directed to the physical network node, said response comprising an identifier of a virtual device; receiving at least one further discovery data packet directed at least to said virtual device; and responding to a first one of said further discovery data packets, said response comprising an identifier of a virtual endpoint device, at least some functionality of the virtual endpoint device being provided by the physical endpoint device.

By responding to discovery data packets within a network by providing identifiers of virtual devices and virtual endpoint devices, a server connected to the network can be caused to register the existence of devices, and endpoint devices which are not physically present within the network. In this way, the server can more efficiently coordinate the use of resources provided by the network. More specifically, the server can be caused to register a plurality of virtual devices the functionality of which are provided by a smaller number of physical devices.

Where references are made herein to a discovery data packet being "directed" to a particular device, such references cover any means intended to cause a data packet to be received by the particular device. For example, where a data packet is addressed to a particular device, it is directed to that device even if it is, in fact, received by another device. Such addressing may be carried out by an originator of the discovery data packet or by an intermediate device. Where reference is made to a data packet being direct at least to a particular device, such reference is to a data packet being intended for that particular device as well as possibly other devices.

The physical network node may comprise a switch to which the physical endpoint device is connected.

The physical network node may comprise a bridge to which the physical endpoint device is connected. Such a bridge may be a component of a switch.

The discovery data packet and the at least one further discovery data packet may be received at the switch and the responses to the discovery data packet and the at least one further discovery data packet may be generated at the switch. In this way the switch may be arranged to "create" virtual devices in a way which is transparent to physical devices connected to the switch. In this way, conventional devices can be connected to the switch but sharing of physical endpoint devices is enabled by the creation of virtual endpoint devices.

The discovery data packet and the at least one further discovery data packet may be received at a control device connected to the switch and the responses may be generated at the control device. In such a case, the "creation" of virtual devices may be managed by the control device, avoiding any need to modify functionality of the switch.

The method may further comprise receiving the discovery data packet and the at least one further discovery data packet at the switch and redirecting the discovery data packet and the at least one further discovery data packet to the control device. The identifiers of the virtual device and the virtual endpoint device may be provided by the control device.

The discovery data packet and the at least one further discovery data packet may be received from a device connected to the switch. For example, the discovery data packet and the at least one further discovery data packet may be received from a server connected to the switch. Each of the discovery data packets may emanate from a discovery controller provided by a server connected to the network.

The method may further comprise receiving a data packet addressed to the virtual endpoint device and transmitting the data packet to the physical endpoint device. Such transmission to the physical endpoint device may be caused by the control device.

The method may further comprise modifying the data packet such that it is addressed to the physical endpoint device. Such modification may be carried out by the control device.

Data packets may be received at the switch. The method further may comprise determining at the switch whether the data packet comprises a command and if it is determined that the data packet comprises a command, forwarding the data packet to the control device.

The virtual device may comprise a virtual network node. For example, the virtual device may be a virtual switch, or a virtual bridge.

The method may further comprise responding to a second one of the further discovery data packets by providing an identifier of a further virtual device.

The response to the first one of the at least one further discovery data packets may indicate that the virtual endpoint device is connected to the further virtual device.

The discovery data packet directed to a physical network node may be received at a first time, while the second one of the further discovery data packets may be received at a second time following the first time. The first one of the further discovery data packets may be received at a third time following the second time.

The method may further comprise receiving a plurality of discovery data packets, each of the plurality of discovery data packets directed to a virtual device, and responding to each of the plurality of discovery data packets with an identifier of a respective virtual endpoint device.

Each of the discovery data packets may be arranged to carry out a depth first search of devices in the network. A depth first search of a network is a search in which, starting from a root node of the network, a path is traversed to a leaf node of that network. Having reached a leaf node of the network, the path is traversed in reverse until a node is reached from which a previously untraversed branch extends. When such a node is reached, the previously untraversed branch is traversed. This process continues until all branches of the network are fully traversed. That is, sequential discovery data packets are used to enumerate nodes on a particular path to a leaf node. Having reached a leaf node, a first untraversed path extending from a node which is encountered when said particular path is traversed in a reverse direction is traversed, and a first device on said untraversed path is enumerated using the immediately subsequent data packet.

The physical endpoint device may be an I/O device, such as a network card.

The physical network node may be associated with a plurality of physical endpoint devices.

The network may be a PCI Express network. The discovery data packets may be PCI Express discovery data packets arranged to enumerate the devices in the PCI Express network, while the data packets may be PCI Express data packets. The virtual devices may be virtual PCI Express devices. The physical endpoint device may be a PCI Express endpoint device such as a PCI Express I/O device.

The physical endpoint device, or at least one of the physical endpoint devices, may provide functionality of a plurality of virtual endpoint devices. The functionality of at least one virtual endpoint device may be provided by a plurality of physical endpoint devices.

Each of the discovery data packets may emanate from a server.

The server may be arranged to run a plurality of virtual machines. For example, the server may be arranged to run a greater number of virtual machines than there are physical endpoint devices connected to the PCI Express network. The presently described embodiments may therefore allow the server to allocate each virtual endpoint device to a respective virtual machine.

It will be appreciated that aspects of the disclosed embodiments can be implemented in any convenient way including by way of suitable hardware and/or software. For example, a switching device arranged to implement the embodiments may be created using appropriate hardware components. Alternatively, a programmable device may be programmed to implement the described embodiments. Some embodiments therefore also provide suitable computer programs for implementing features and aspects of the embodiments. Such computer programs can be carried on suitable carrier media including tangible carrier media (e.g. hard disks, CD ROMs and so on) and intangible carrier media such as communications signals.

BRIEF DESCRIPTION OF THE DRAWINGS

Embodiments of the methods and systems are now described, by way of example, with reference to the accompanying drawings in which.

DETAILED DESCRIPTION

Figure 1:
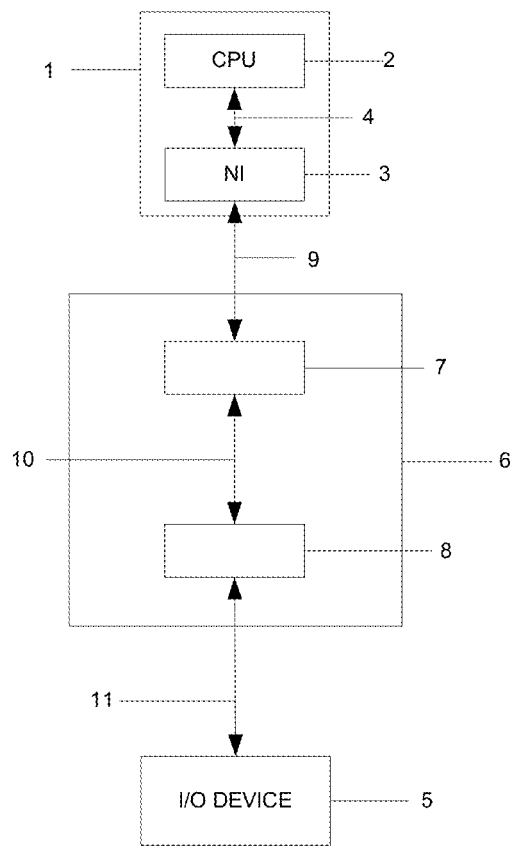
FIG. 1 is a schematic illustration showing a network in which a server is connected to an I/O device through a switch.

Referring first to FIG. 1, there is shown a schematic illustration of a network. A server 1 comprises a central processing unit (CPU) 2 and a network interface 3, the CPU 2 and the network interface 3 are connected by a connection 4. The server 1 is connected to an input/output (I/O) device 5 via a connection through a switch 6. The server 1 and the I/O device 5 communicate using the PCI Express protocol. That is, the I/O device 5 is a PCI Express device and the switch 6 is a PCI Express switch, while the network interface 3 is a PCI Express network interface. It will be appreciated that PCI Express is used merely by way of example and that other interconnect technologies could be similarly employed. In PCI Express the network interface 3 is often termed a root complex (RC).

The switch 6 comprises two bridges 7, 8. The network interface 3 is connected to the bridge 7 by way of a connection 9, the bridge 7 connects to the bridge 8 by way of a connection 10 and the bridge 8 connects to the I/O device 5 by way of a connection 11.

The server 1 communicates with the I/O device 5 by sending and receiving data packets through the switch 6. A transaction between the I/O device 5 and the server 1 may be made up of one data packet or a plurality of data packets. The server 1 may transmit data packets to or receive data packets from the I/O device 5. For example, a single transaction may involve the server 1 sending a request data packet to the I/O device 5 and the I/O device 5 responding by sending one or more completion data packets to the server 1. Data packets sent from the server 1 to the I/O device 5 are first transmitted from the network interface 3 to the bridge 7 over the connection 9. From the bridge 7, data packets are transmitted to the bridge 8 over the connection 10. From the bridge 8, data packets are transmitted to the I/O device 5 over the connection 11.

The I/O device 5 may be arranged to provide a plurality of independent device functions, a maximum of eight functions being supported by the PCI Express protocol. That is, for example, the I/O device 5 may appear to the server 1 to be eight separate devices. Each device function of the I/O device 5 has a corresponding identifier uniquely identifying that function. Data packets sent from a particular device function of a shared I/O device 5 have a transaction identifier comprising a requester identifier that corresponds to the identifier of the device function sending the data packet.

Figure 2:
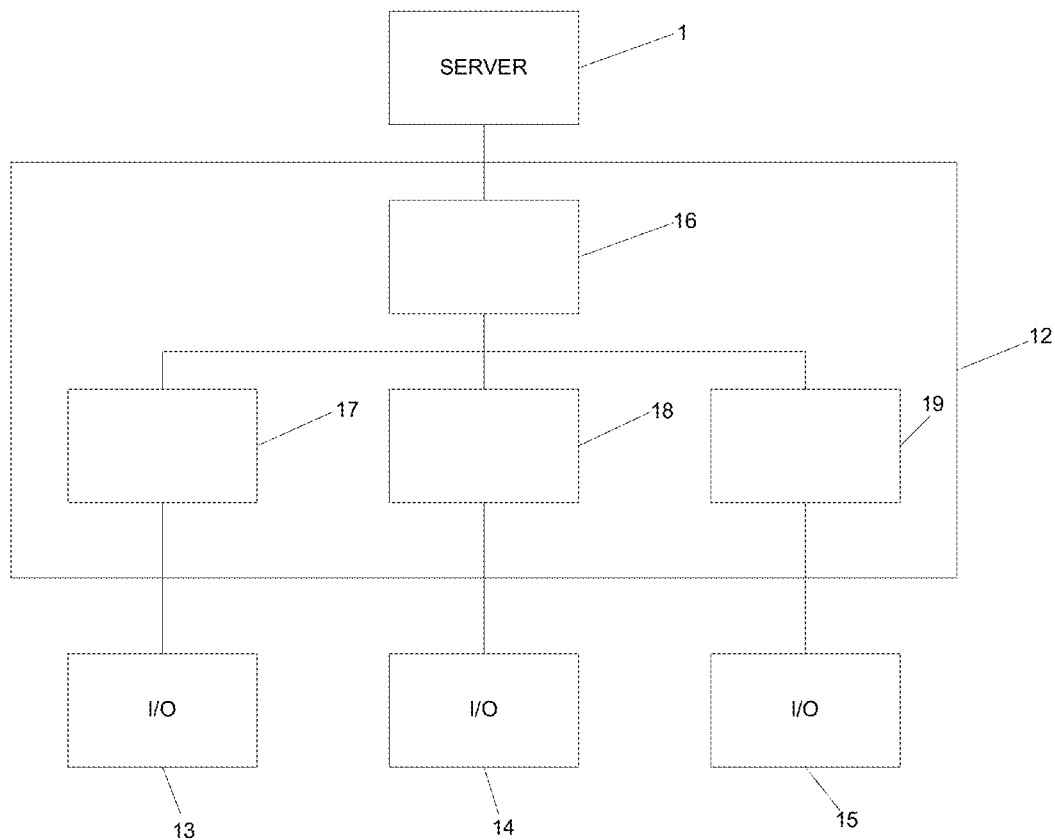
FIG. 2 is a schematic illustration showing a network in which a server is connected to three I/O devices through a switch.

It will be appreciated that the arrangement of FIG. 1 shows a simple connection between the server 1 and the I/O device 5. FIG. 2 shows an alternative arrangement where a switch 12 provides communication between the server 1 and three I/O devices 13, 14, 15. The server 1 is connected to an upstream bridge 16 of the switch 12, while each of the I/O devices 13, 14, 15 is connected to a respective downstream bridge 17, 18, 19. Each of the downstream bridges 17, 18, 19 is connected to the upstream bridge 16.

As is now described in more detail with reference to FIG. 3, the enumeration of a PCI Express network of the types shown in FIGS. 1 and 2 is performed using a depth first search of the devices connected to the network. The enumeration process is intended to apply identifiers to each device connected to the network, and to allow the server 1 to obtain information as to the devices connected to the network.

Figure 3:
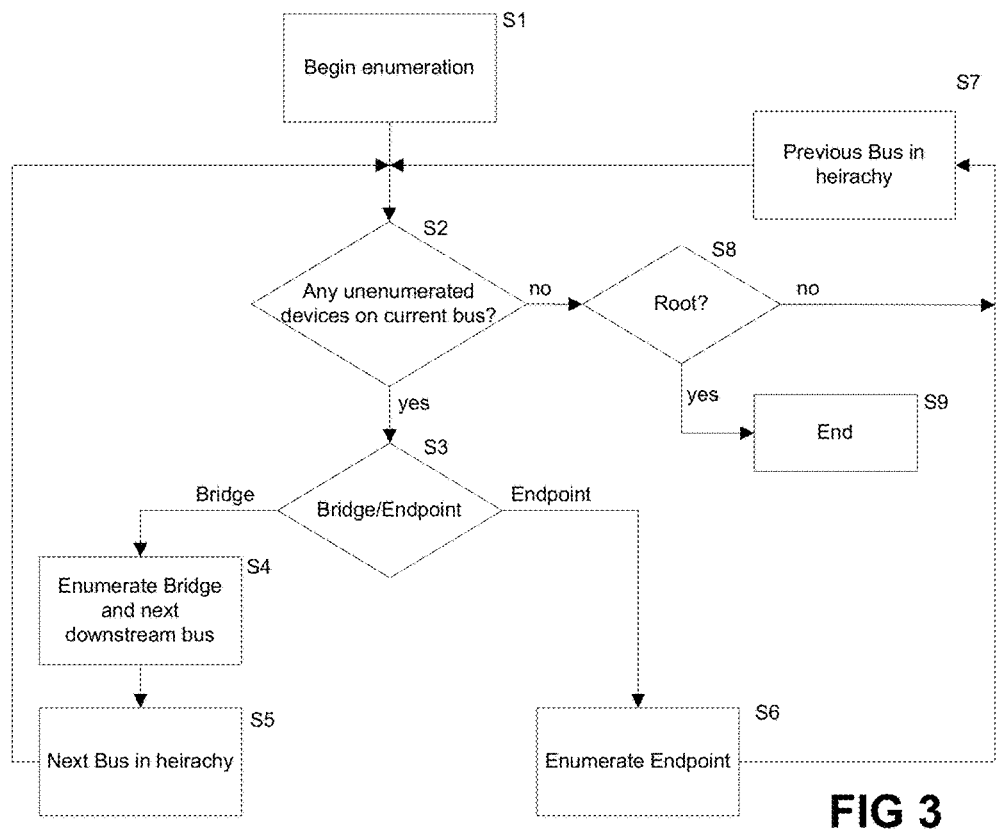
FIG. 3 is a flowchart showing processing carried out to enumerate the network of FIG. 1.

The processing of FIG. 3 is first described in general terms. At step S1 enumeration of a PCI Express network begins when enumeration software running on a server connected to the network sends an enumeration control packet along the connection from the server's network interface, to determine, at step S2, whether there are any devices connected to that connection which have not been enumerated.

The connection from the network interface (or root complex) is generally enumerated as BUS0. If it is determined that there is an unenumerated device connected to the bus BUS0, that device will respond to the enumeration control packet by returning a response control packet identifying itself to the enumeration software.

If it is determined that an unenumerated device is connected to the bus BUS0, processing then passes to step S3, and, based on the information in the response control packet, it is determined whether the device connected to the current bus is a bridge or an endpoint. A bridge is a device which connects two devices, while an endpoint has only a connection to a single device. If the device connected to the bus BUS0 is a bridge, processing passes to step S4 and the bridge is assigned a device number (which is unique for that bus) by the enumeration software. For example, the first device enumerated on the bus BUS0 may be assigned the device number 0. The downstream (i.e. away from the server) connection from the device 0 is assigned the next available bus number. For example, where a bridge is the first enumerated device connected to bus BUS0, the downstream connection from that bridge may be enumerated as BUS1.

As part of the enumeration of the bridge at step S4, the enumeration software sets the values of bus number registers stored at the bridge. A primary bus number register stores the bus number of the bridge's immediate upstream (i.e. towards the server) connection, e.g. BUS0 for a device connected to the bus BUS0. A secondary bus number register stores the bus value of the bridge's immediate downstream connection, for example BUS1 where the bridge is the first device connected to the bus BUS0. A subordinate bus number register stores the bus number of the furthest enumerated downstream bus from the bridge.

From step S4 processing passes to step S5 at which the enumeration software inspects the next bus in the network hierarchy. Processing then passes to step S2, at which it is determined whether there are any unenumerated devices connected to the current bus (i.e. the bus selected at step S5). Processing loops through steps S2 to S5 until there are no further bridges in a particular branch of the PCI Express network being enumerated.

If, at step S3, it is determined that an unenumerated device connected to a bus is an endpoint in the hierarchy (such as an I/O device), processing passes to step S6 and the endpoint is enumerated with a device number unique for the bus on which it is connected.

As there are no further PCI Express connections from an endpoint, processing passes from step S6 to step S7 and the enumeration software returns to the previous bus in the network hierarchy to determine, at step S2 whether there are any devices on that bus which have yet to be enumerated.

If, at step S2, it is determined that there are no further devices on a particular bus to be enumerated, processing passes to step S8 at which it is determined whether the bus currently being examined is the root of the network hierarchy (i.e. the bus BUS0). If, at step S8 it is determined that the bus currently being examined is not the root, processing passes to step S7 and the enumeration software returns to the previous bus in the network hierarchy to determine, at step S2 whether there are any devices on that bus which have yet to be enumerated.

If, on the other hand, it is determined at step S8 that the current bus is the root, this shows that every branch of the network hierarchy has been traversed such that there are no further bridges or endpoints in the network to be enumerated, and processing therefore ends at step S9.

Figure 4:
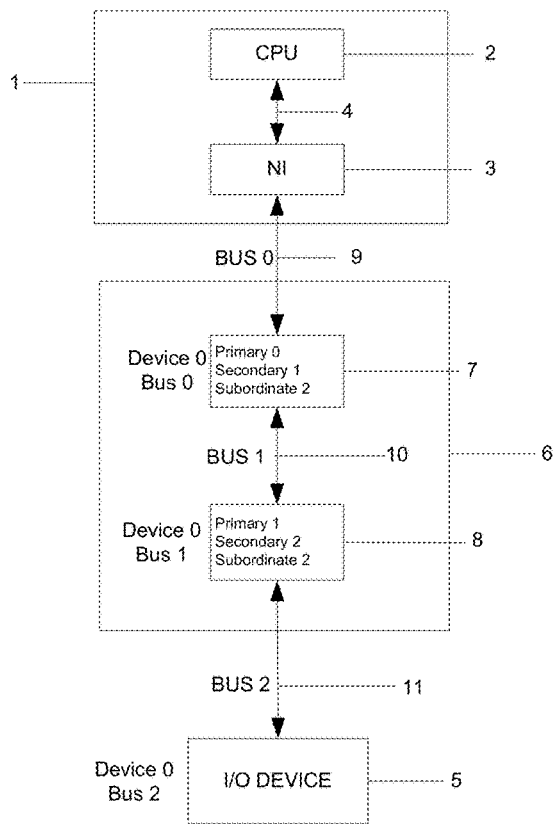
FIG. 4 is a is a schematic illustration showing the network of FIG. 1 after the processing of FIG. 3.

To aid understanding of the processing described with reference to FIG. 3, an example is now provided with reference to the arrangement illustrated in FIG. 4. FIG. 4 shows the arrangement of FIG. 1 after the processing described above with reference to FIG. 3.

At step S1 the server 1 transmits an enumeration control packet along the connection 9 (enumerated as the bus BUS0). At step S2 it is determined that there is a device connected to the current bus (the bus BUS0) when the bridge 7 responds to the enumeration control packet. At step S3 it is determined, from the information contained in the response, that the device connected to the current bus (the bus BUS0) is a bridge. At step S4, the bridge 7 is enumerated as device 0 on the bus BUS0, and the connection 10 is enumerated as BUS1.

The primary bus register of the bridge 7 is set to indicate the bus BUS0, the secondary bus register of the bridge 7 is set to indicate the bus BUS1, and the subordinate bus register of the bridge 7 is set to indicate the bus BUS1 which is currently the furthest enumerated subordinate bus of the bridge 7 (although the subordinate bus register is updated as described below). At step S5 the enumeration software proceeds to inspect the next bus in the hierarchy, i.e. the bus BUS1, and processing returns to step S2.

At step S2 it is determined that a device, the bridge 8, is connected to the current bus (the bus BUS1), and at step S3 it is determined that the device is a bridge. At step S4 the bridge 8 is enumerated as device 0 on the bus BUS1 and the connection 11 is enumerated as BUS2.

The primary bus register of the bridge 8 is set to indicate the bus BUS1, the secondary bus register of the bridge 8 is set to indicate the bus BUS2, and the subordinate bus register of the bridge 8 is set to indicate the bus BUS2. The subordinate bus register of the bridge 7 is now amended to also indicate the bus BUS2, as this is now the furthest enumerated subordinate bus of the bridge 7. At step S5 the enumeration software proceeds to inspect the next bus in the hierarchy, i.e. the bus BUS2, and processing returns to step S2.

At step S2, it is determined that there is a device connected to the bus currently being examined (the bus BUS2), and at step S3 it is determined that this device is an endpoint, the I/O device 5. Processing therefore passes to step S6 and the I/O device 5 is enumerated as device 0 on the bus BUS2. Processing then passes to step S7 and the previous bus in the hierarchy, i.e. the bus BUS1 is set to be the current bus.

At step S2 it is determined that there are no further devices on the current bus (the bus BUS1), and at step S8 it is determined that the current bus is not the root of the network hierarchy. Processing therefore passes to step S7 and the previous bus in the hierarchy (the bus BUS0) becomes the current bus.

There are no further devices connected to the bus BUS0, therefore processing passes to step S8 and it is determined that the current bus is the root of the network hierarchy. Processing passes from step S8 and ends at step S9.

Figure 5:
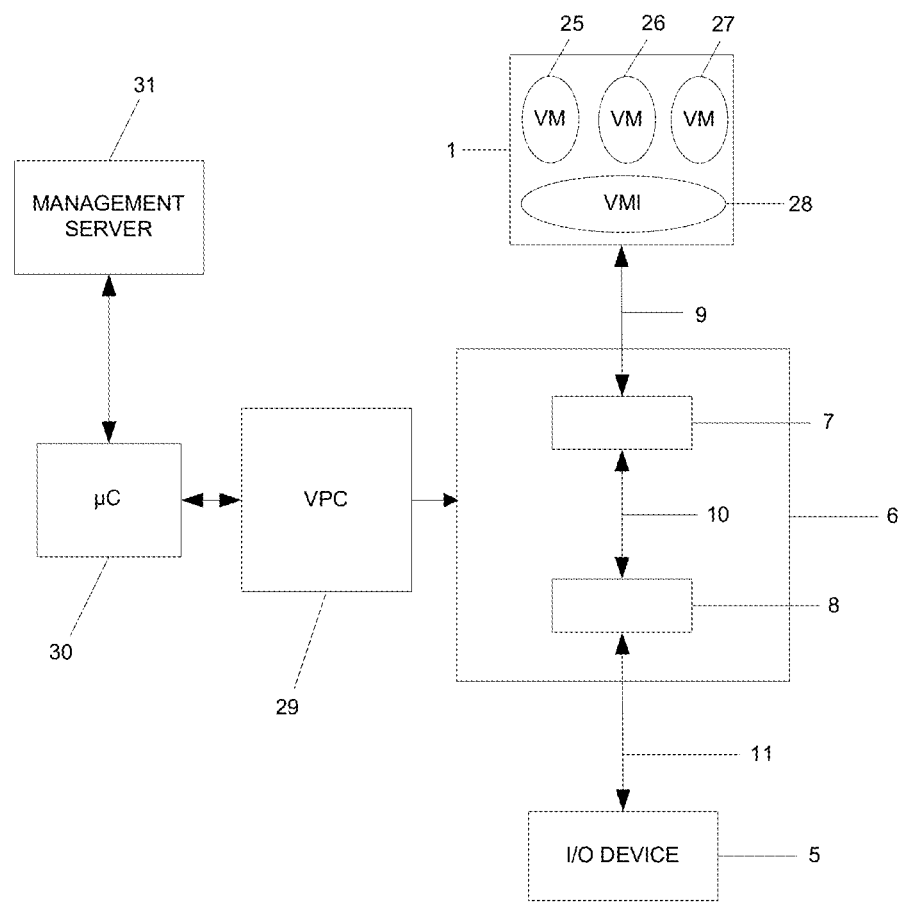
FIG. 5 is a schematic illustration of the network of FIG. 1 modified to include a virtualization proxy controller in accordance with embodiments of the disclosed systems.
Figure 6:
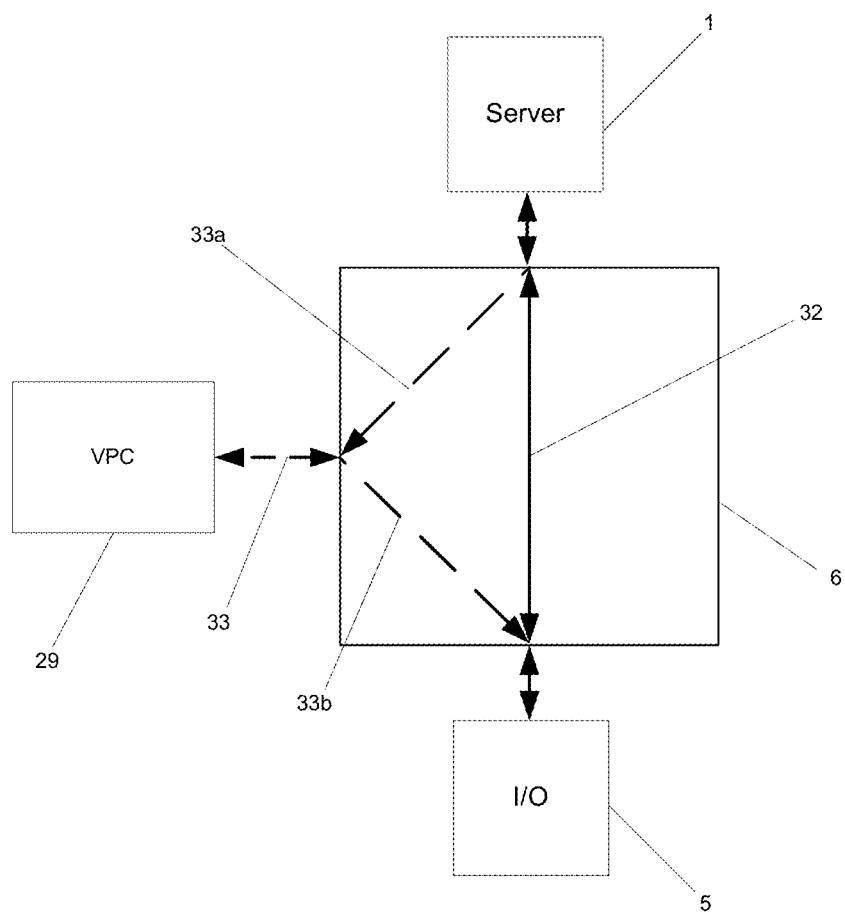
FIG. 6 is a schematic illustration showing how data packets are transferred between a server, an I/O device and the VPC in the arrangement of FIG. 5.

Having described the enumeration of a PCI Express network, there is now described the enumeration of a PCI Express network modified in accordance with an embodiment. FIG. 5 illustrates the network of FIG. 1 adapted in accordance with embodiments of the systems, while FIG. 6 shows how the network of FIG. 5 is perceived by the server 1 after enumeration in accordance with an embodiment of the systems. To aid clarity the CPU 2 and the network interface 3 are not shown in FIG. 5.

Referring to FIG. 5 it can be seen that the server 1 is adapted to execute three virtual machines 25, 26, 27 concurrently. Each virtual machine 25, 26, 27 may comprise an operating system requiring access to physical resources on the PCI Express network, such as I/O resources.

A virtual machine manager 28 operates on the server 1 between the hardware of the server 1 and the virtual machines 25, 26, 27 running on the server 1. The virtual machine manager 28 provides an abstracted view of the hardware resources available to the server 1 (including processor, memory, and resources connected to the PCI Express network such as the I/O device 5) to each of the virtual machines 25, 26, 27 such that each virtual machine 25, 26, 27 is unaware of the other virtual machines operating on the server 1. The virtual machine manager 28 can therefore ensure that operation of any one of the virtual machines 25, 26, 27 does not conflict with the operation of another of the virtual machines 25, 26, 27. All communications between a virtual machine 25, 26, 27 and a physical resource are processed by the virtual machine manager 28.

A further device, a virtualization proxy controller 29, is connected to the switch 6. As is described in further detail below, the virtualization proxy controller 29 provides a virtualized view of the devices in the PCI Express network to the server 1. Operation of the virtualization proxy controller 29 is configured by a microcontroller 30 which receives commands from a management server 31. In this way an administrator can use the management server 31 to provide commands indicating how the virtualization proxy controller 29 should operate, and such commands are then provided to the virtualization proxy controller 29 by the microcontroller 30.

In general terms, some data packets between the server 1 and the I/O device are intercepted within the switch 6 and are directed to the virtualization proxy controller 29. Such data packets can be subjected to processing by the virtualization proxy controller, and such processing can be carried out in a way which is transparent both to the server 1 and the I/O device 5.

PCI Express transactions can, for present purposes, be considered as either control transactions or data transactions. Data packets which are part of control transactions are redirected to the virtualization proxy controller 29, while data packets which are part of data transactions are routed in a conventional manner through the switch, that is from a source directly to a destination via the switch 6. Transactions using the PCI Express protocol can generally be classified into one of five classes:

1. Commands sent from a server to an I/O device;
2. Status read commands sent by a server relating to resources of an I/O device;
3. I/O device commands reading command descriptors in server memory;
4. I/O device commands writing status descriptors in server memory; and
5. I/O device commands reading/writing data buffers in server memory Transactions classified in classes 1 to 4 are considered to be control transactions, and data packets of such transactions are redirected to the virtualization proxy controller 29 as described in further detail below. Transactions classified in class 5 are considered to be data transactions and data packets of such transactions are not redirected to the virtualization proxy controller 29. It can be noted that data transactions make up the vast majority (approximately 90%) of transactions between servers and I/O devices.

The redirection of data packets of control transactions is schematically illustrated at a high level in FIG. 6, by way of an example involving a data packet sent from the server 1 to the I/O device 5. It can be seen that data packets transmitted by the server 1 are received by the switch 6. Data packets which are part of data (i.e. not control) transactions are forwarded directly to the I/O device 5 as indicated by a path 32 through the switch 6 shown in full line. Data packets which are part of a control transaction are redirected by the switch 6 to the virtualization proxy controller 29, being forwarded along a path 33a shown in broken line. Data packets are also transmitted from the virtualization proxy controller 30 to the I/O device 5 along the path 33b. The virtualization proxy controller 29 may transmit data packets to the server 1 along the path 33a of its own volition or in response to receipt of a particular data packet from an I/O device 5.

An administrator may instruct the virtualization proxy controller 29 to provide a virtualized view of the devices in the PCI Express network, such that the virtual machine manager 28 running on the server 1 detects three I/O devices, that is sufficient I/O devices to assign each of the virtual machines 25, 26, 27 with a dedicated I/O device. The management server 31 therefore provides an interface through which an administrator can configure the number, and location of virtual devices in the PCI Express network, the functionality associated with the virtual devices being provided by physical devices connected to the PCI express network.

In order to provide a virtualised view of the devices in the PCI Express network, the virtualization proxy controller 29 is arranged to intercept enumeration control packets during the initialisation of the PCI Express network, and to respond to those enumeration control packets such that enumeration software running on the server 1 is caused to register the existence of a device hierarchy that does not physically exist. In this way, the virtualization proxy controller 29 can create a virtualized device hierarchy in which there are a number of I/O devices specified by the management server 31. For example, as set out above, the virtualization proxy controller 29 can create a virtualized device hierarchy comprising three I/O devices, such that each virtual machine 25, 26, 27 can access what appears to be a dedicated I/O device. In this way, the relatively computationally expensive operation of the virtual machine manager 28 is reduced, by removing the need to co-ordinate accesses by the virtual machines 25, 26, 27 to the physical I/O device 5.

The operation of the virtualization proxy controller 29 in providing a virtualized view of the device hierarchy is now described with reference to the flowchart of FIG. 3 and the arrangement illustrated in FIG. 7.

The enumeration of the network shown in FIG. 7 proceeds as described with reference to FIG. 1. That is, the connection 9 is enumerated as BUS0, the bridge 7 is enumerated as device 0 on the bus BUS0, the connection 10 is enumerated as BUS1, the bridge 8 is enumerated as device 0 on the bus BUS1 and the downstream connection of the bridge 8 is enumerated as BUS2. Having enumerated the bridge 8 as device 0 on the bus BUS1, processing then passes to step S5 of FIG. 3 and the enumeration software proceeds to interrogate the next level in the network hierarchy, i.e. the bus BUS2.

Rather than returning data indicating the enumeration of the I/O device 5, the enumeration control data packet is processed by the virtualization proxy controller 29 which causes a response to be provided to the enumeration control data packet, relating to a virtual device.

In more detail, at step S2 of FIG. 3, the virtualization proxy controller 29 responds to the enumeration control data packet with a response to indicate that a bridge is connected to the bus BUS2. A bridge 34 is shown in dashed outline in FIG. 7 to indicate that the bridge 34 is a virtual bridge. The enumeration software enumerates the virtual bridge 34 as device 0 on the bus BUS2. A virtual connection 35 from the virtual bridge 34 is enumerated as BUS3.

Processing then passes to step S5 and the enumeration software interrogates what appears to be the next bus in the hierarchy, i.e. the virtual bus BUS3. Again, the enumeration control packet is redirected to the virtualization proxy controller 29, which responds to indicate that a bridge 36 is connected to the bus BUS3. At step S4 the virtual bridge 36 is enumerated as device 0 on the bus BUS3 and the virtual connection 37 from the bridge 36 is enumerated as BUS4.

At step S5 the enumeration software interrogates what appears to be the next bus in the hierarchy, the virtual bus BUS4. The enumeration control packet is again redirected to the virtualization proxy controller 29. The virtualization proxy controller 29 responds to indicate that an I/O device (the virtual I/O device 38) is connected to the virtual bus BUS4. Processing therefore passes through steps S2, S3 and to S6 at which the virtual device 36 is enumerated as device 0 on the bus BUS4.

Processing then passes to step S7, and the enumeration software interrogates the previous bus in the hierarchy, i.e. the bus BUS3 (the virtual connection 35), to determine if there are any unenumerated devices on the bus BUS3. The enumeration control packet is again redirected to the virtualization proxy controller 29 which is arranged to respond as though a further bridge (the virtual bridge 39) is connected to the virtual bus BUS3. Processing therefore passes from steps S7 to S2 at which the server 1 determines that there is an unenumerated device on the bus BUS3, and from step S2 to S3 at which it is determined that the unenumerated device is a bridge. Processing therefore passes to step S4 and the virtual bridge 39 is enumerated as device 1 on the bus BUS3, while the virtual connection 40 from the virtual bridge 39 is enumerated as BUS5.

From step S4, processing passes to step S5 and an enumeration control packet is sent along the next bus in the hierarchy, the virtual bus BUS5. The enumeration control packet is redirected to the virtualization proxy controller 29. The virtualization proxy controller 29 responds to indicate that an I/O device (the virtual I/O device 41 in FIG. 7) is connected to the virtual bus BUS5. Processing therefore passes through steps S2, S3 and to S6 at which the virtual I/O device 41 is enumerated as device 0 on the bus BUS5.

Processing then passes to step S7, and an enumeration control packet is transmitted along the previous bus in the hierarchy, i.e. the virtual bus BUS3, to determine if there are any unenumerated devices on the virtual bus BUS3. The enumeration control packet is again redirected to the virtualization proxy controller 29 which is arranged to respond as though a further bridge (the bridge 42) is connected to the virtual bus BUS3. Processing therefore passes from steps S7 to S2 at which the server determines that there is an unenumerated device on the bus BUS3, and from step S2 to S3 at which it is determined that the unenumerated device is a bridge. Processing therefore passes to step S4 and the virtual bridge 42 is enumerated as device 2 on the bus BUS3 while the virtual connection 43 from the virtual bridge 42 is enumerated as BUS6.

Processing then passes to step S5 and an enumeration control packet is transmitted along the next bus in the hierarchy, the virtual bus BUS6. The enumeration control packet is redirected to the virtualization proxy controller 29. The virtualization proxy controller 29 responds to indicate that an I/O device (the virtual I/O device 44) is connected to the virtual bus BUS6. Processing therefore passes through steps S2, S3 and to S6 at which the virtual device I/O 44 is enumerated as device 0 on bus BUS6.

Figure 7:
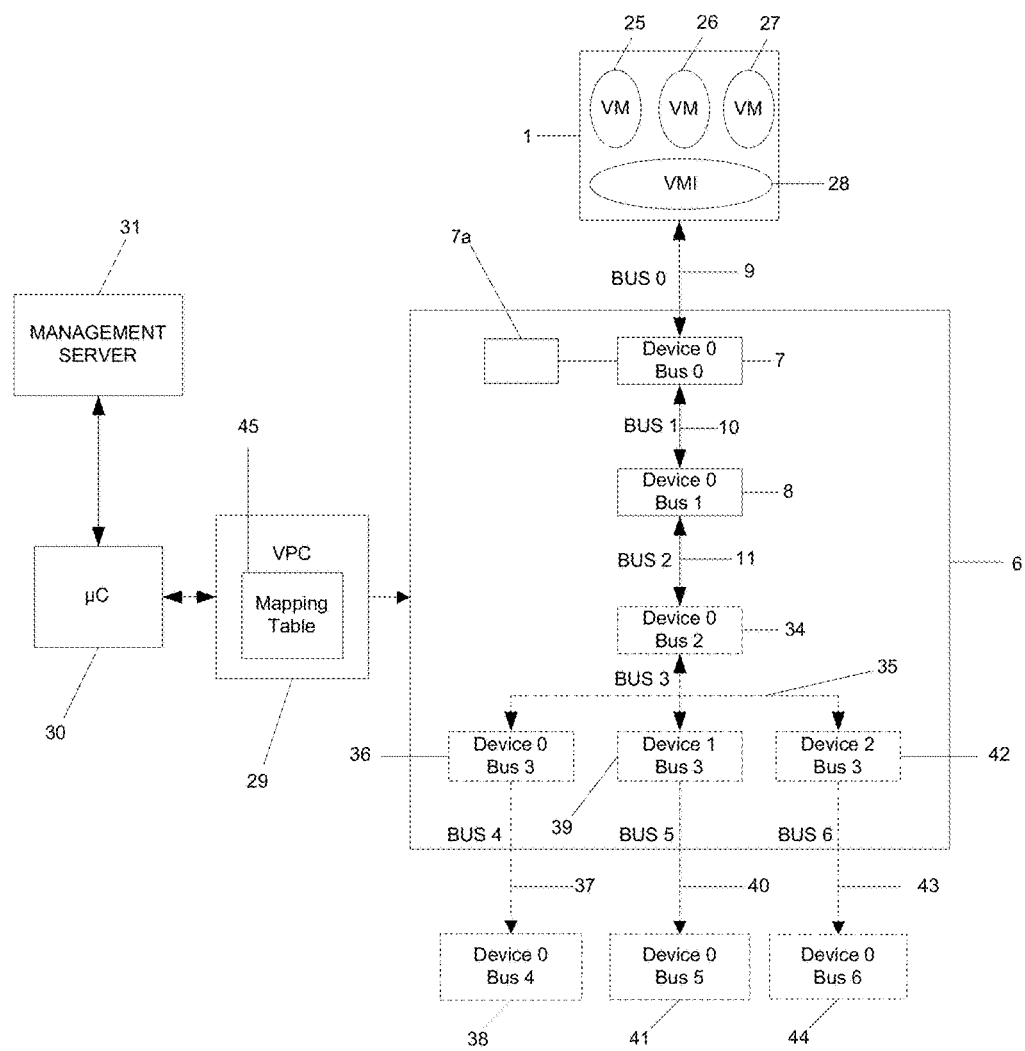
FIG. 7 is a schematic illustration of the network of FIG. 5 as seen by the server after processing in accordance with embodiments of the disclosed systems.

There are no more devices in the network of FIG. 7, and the virtualization proxy controller 29 is not arranged to virtualize any further devices. As such, processing loops through steps S7, S2 and S8 until it is determined at step S8 that the current bus is the bus BUS0. Processing then passes from step S8 to end at step S9.

As, in the arrangement of FIG. 7, there is only a single physical I/O device, the I/O device 5, connected to the server 1, data packets directed to one of the virtual I/O devices 38, 41, 44 are re-directed, by a controller 7a provided at the bridge 7 within the switch 6 to the I/O device 5. The process of re-directing the control packets is now described in further detail.

Figures 8, 9, 10:
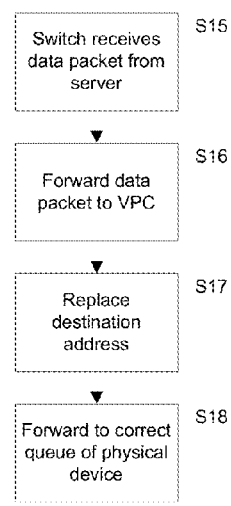
FIG. 8 is a schematic illustration of a table stored by the virtualization proxy controller of FIG. 5.
FIG. 9 is a schematic illustration of a table stored by a virtualization proxy controller in a network having two I/O devices.
FIG. 10 is a flow chart showing processing carried out by the virtualization proxy controller to direct data packets through the network of FIG. 5.

The virtualization proxy controller 29 maintains a record of the mappings between the virtual I/O devices 38, 41, 44 and queues provided by the physical I/O device 5 in a mapping table 45. The virtual machine manager 28 maps each virtual machine to a respective virtual device and consequently a respective queue in the physical device 5 (although the mapping to queues is not apparent to the virtual machine manager 28). FIG. 8 shows a mapping table suitable for mapping the virtual I/O devices 38, 41, 44 to the physical I/O device 5 in the arrangement of FIG. 7. The mapping table is accessible to the controller 7a provided at the bridge 7 so as to allow the controller 7a to appropriately direct received data packets.

While the PCI Express network described above with reference to FIGS. 2 and 7 has a single physical I/O device, it will be appreciated that further physical I/O devices may be connected to the switch 6. Where more than one physical I/O device is connected to the switch 6, each physical I/O device can have a respective independent set of virtual devices, controlled by the virtualisation proxy controller 29.

FIG. 9 shows an example of a mapping table 45 suitable for mapping two physical I/O devices, an I/O device A and an I/O device B, to three virtual I/O devices X, Y, Z. The mapping table of FIG. 9 maps the virtual I/O devices X and Y to the physical I/O device B while mapping the virtual I/O device Z to the physical I/O device A. It will be appreciated that any appropriate mapping may be specified, and that the mapping may be altered in order to meet varying requirements of virtual machines running on the server 1. It will be appreciated that in the example of FIG. 9 the physical I/O devices A and B are connected to a single switch.

The process of transmitting a control data packet from one of the virtual machines 25, 26, 27 to the I/O device 5 is now described with reference to FIG. 10 along with the mapping table of FIG. 8 and the arrangement of FIG. 7. The following description assumes that the I/O device 5 only provides a single device function and that the virtualization proxy controller 29 is instructed to provide each of the virtual I/O devices 38, 41, 44 with a single device function, such that data packets are always addressed to the single device function.

Referring now to FIG. 10, at step S15 the switch 6 receives a data packet from the server 1, addressed to the virtual I/O device 38 (i.e. addressed to device 0, BUS4). If the data packet is a control data packet, at step S16 it is forwarded to the virtualization proxy controller 29.

At step S17 the virtualization proxy controller 29 replaces the destination address specified in the header of the data packet with the corresponding address from the mapping table 45. In the present example, the destination address specified in the data packet is the virtual I/O device 38, which, referring to the table of FIG. 8, is mapped to a queue QUEUE0 of the I/O device 5. At step S18 the virtualization proxy controller 29 forwards the modified data packet to the physical I/O device 5. It should be noted that in addition to modifying the data packet to include a relevant identifier for the physical I/O device, the virtualization proxy controller modifies a return address within the data packet such that a response data packet generated by the I/O device 5 is returned to the virtualization proxy controller 29 for processing before being directed onwards to the server 1.

In the preceding description it has been explained that switches can comprise a plurality of interconnected bridges. An arrangement for connecting the virtualization proxy controller 29 to those bridges is now described with reference to FIG. 11.

Figure 11:
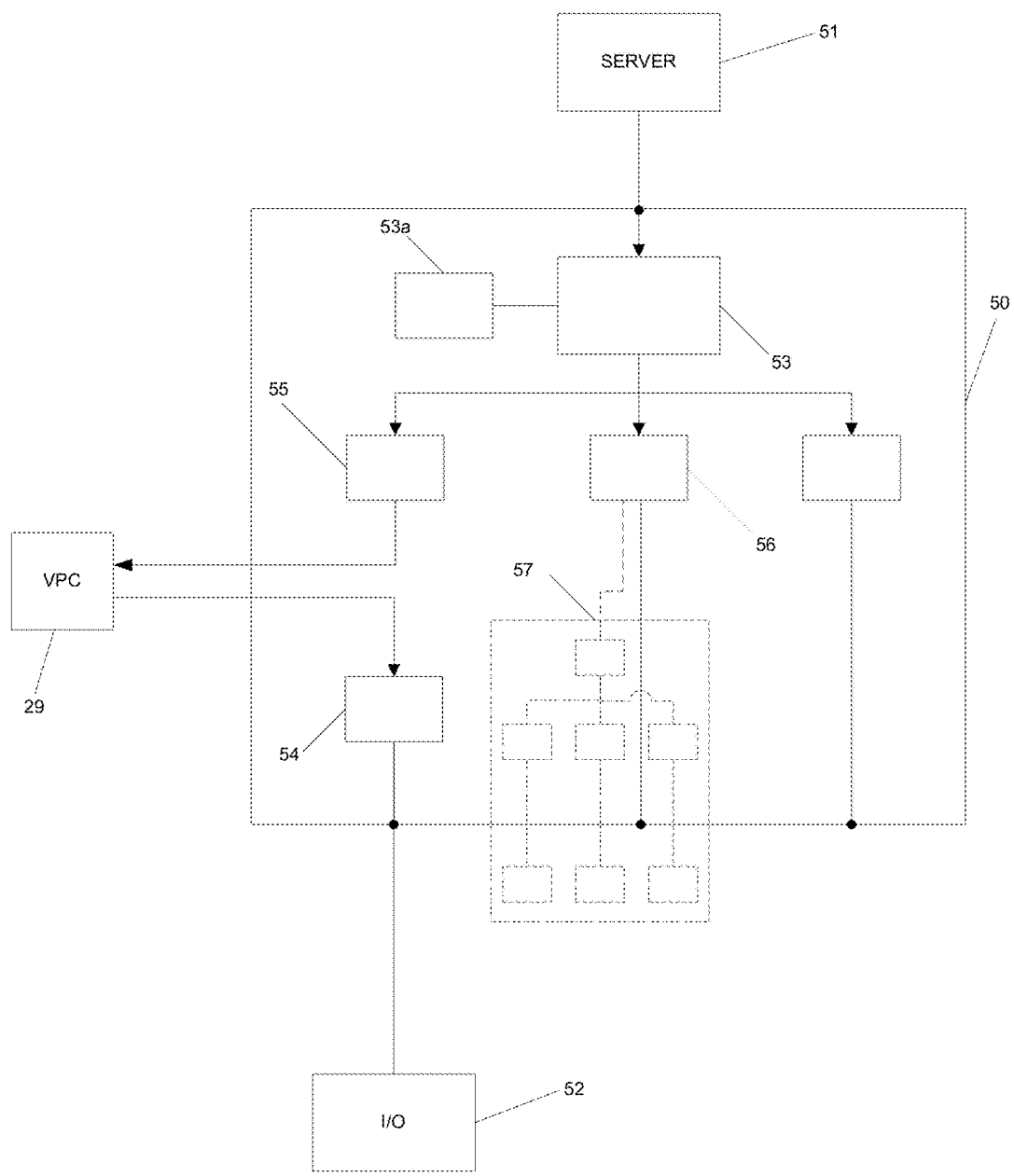
FIG. 11 is a schematic illustration of a showing how a VPC may be connected to an I/O device and a server through bridges in a switch.

FIG. 11 shows a switch 50 to which a server 51 and an I/O device 52 are connected. The server 51 is connected to an upstream bridge 53, while the I/O device 52 is connected to a down stream bridge 54. The virtualization proxy controller 29 is connected to a bridge 55 to which the upstream bridge 53 and the downstream bridge 54 are connected. The upstream bridge 53 is also connected to a further bridge 56.

The virtualisation proxy controller 29 is arranged to virtualize a collection of devices 57 which appear to the server to be connected to the further bridge 56. That is, the virtualisation proxy controller 29 responds to enumeration control packets in such a way that the device hierarchy as "seen" by the server includes the virtual devices 57 connected to the bridge 56. Functionality of the devices 57 is provided by the I/O device 52.

As described above, control data packets transmitted from the server 51 to any device connected to the switch 50 are intercepted and redirected to the virtualisation proxy controller 29. Any unexpected read or write communication from the server will comprise a control data packet and will therefore be redirected to the virtualisation proxy controller 29. Similarly, any unexpected communication from the I/O device 52 to the server 51 will also comprise a control data packet and will therefore be redirected to the virtualisation proxy controller 29.

Such unexpected communications will include unexpected read or write communications. Such unexpected communications will provide addresses within the memory of the server 51 at which descriptors of data to be transferred can be found. Such descriptors form a linked list, each entry in the list identifying data to be transferred. The virtualisation proxy controller 29 receives the diverted information and retrieves the descriptors from the relevant memory. Given that the retrieval requests are initiated by the virtualisation proxy controller, the data read is automatically directed to the virtualisation proxy controller 29. Having read the data as appropriate, the virtualisation proxy controller can then appropriately amend the address for which the redirected control data packet is intended by the server 51 (which may be an address of a virtual I/O device) so as to reference the physical I/O device 52.

The VPC then forwards the request for the data transfer to the I/O device 52. The I/O device is then able to access data in the memory of the server 51, but in doing so appropriately amends its identity so that it appears to the server 51 that the request originates from the virtual devices with which the server 51 is communicating. Such identity modification can be carried out within the switch 60. When the server 51 responds to the request, the response will identify one of the virtual devices. However a controller 53a associated with the bridge 53 will amend the identity of the device to which the data is to be sent so as to appropriately direct the data to the I/O device 52.

From the preceding description it can be seen that the virtualisation proxy controller 29 is arranged to create a set of virtual devices 57 for use by the server 51. When data is transferred between those devices, the virtualisation proxy controller 29 intercepts an expected communication so as to ensure that descriptors provided are appropriately handled. Thereafter, control logic within the switch 50 appropriately directs data packets, so as to avoid such packets being redirected to the virtualisation proxy controller 29.

In the preceding description it has been explained that the bridge 53 of FIG. 11 has an associated controller 53a, while the bridge 7 of FIG. 7 has an associated controller 7a. In some embodiments, each bridge of a switch has an associated controller so as to allow identifiers of a particular device (in terms of bus and device numbers) to be appropriately amended so that virtual devices can be appropriately accessed by the server 51. That is, in some embodiments, each bridge can incorporate control logic arranged to carry out appropriate modification of device identifiers.

The preceding description has explained how the virtualization proxy controller 29 which is external to a switch is concerned with the configuration of virtual devices. In alternative embodiments, virtual devices may be created by circuitry within the switch itself. That is, the functionality described above to create virtual devices may be located within the switch, thereby obviating the need for the virtualization proxy controller. However, in some embodiments the use of the virtualization proxy controller is preferred as a more standard switching arrangement can be provided which need not handle the complexity involved in creating virtual devices.

Various modifications and applications of the present invention will be readily apparent to the appropriately skilled person from the teaching herein, without departing form the scope of the appended claims.

We claim:

1. A method comprising:
    intercepting, at an intercepting device, enumeration packets directed to a physical network device hierarchy, the physical network device hierarchy comprising at least one network device and at least one physical endpoint device;
    in response to intercepting the enumeration packets, transmitting at least one response data packet to each of the enumeration packets, the at least one response data packet presenting a virtualized device hierarchy, the virtualized device hierarchy comprising at least one virtual network device and at least one virtual endpoint device;
    transparently to the at least one physical endpoint device, storing a mapping between an identifier of the at least one virtual endpoint device and a queue of the at least one physical endpoint device, each virtual endpoint device having an associated identifier;
    receiving a data packet addressed to the at least one virtual endpoint device and having a return address for routing a response packet thereto; and
    prior to forwarding the data packet to the queue associated with the at least one physical endpoint device, modifying the return address of the data packet to be that of a physical address of the intercepting device.

2. The method of claim 1, wherein the at least one network device comprises a switch to which the at least one physical endpoint device is at least indirectly connected.

3. The method of claim 2, wherein the enumeration packets are received at a control device connected to the switch, and the at least one response data packet is generated at the control device.

4. The method of claim 3, further comprising:
    receiving the enumeration packets at the switch; and
    redirecting the enumeration packets to the control device, wherein each virtual network device has an associated identifier, the identifiers of the at least one virtual network device and the at least one virtual endpoint device are provided by the control device.

5. The method of claim 2, wherein the enumeration packets are received from a device connected to the switch.

6. The method of claim 1, wherein the network device comprises a bridge to which the at least one physical endpoint device is connected.

7. The method of claim 1, further comprising:
    using the identifier identifying the at least one virtual endpoint device to obtain from the mapping an identifier identifying the at least one physical endpoint device; and
    transmitting the data packet to the identified at least one physical endpoint device.

8. The method of claim 7, further comprising modifying the data packet such that the data packet is addressed to the identified at least one physical endpoint device.

9. The method of claim 1, wherein the virtualized device hierarchy comprises a plurality of virtual network devices including the at least one virtual network device.

10. The method of claim 9, wherein the virtualized device hierarchy comprises a hierarchy of virtual network devices including the at least one virtual network device.

11. The method of claim 1, wherein the at least one physical endpoint device is an I/O device.

12. The method of claim 1, wherein the at least one network device is associated with a plurality of physical endpoint devices.

13. The method of claim 1, wherein the network is a PCI Express network.

14. The method of claim 1, wherein the at least one response data packet is arranged to present the virtualized device hierarchy comprising a plurality of virtual endpoint devices including the at least one virtual endpoint device, and wherein storing a mapping comprises storing mappings between identifiers of the plurality of virtual endpoint devices and respective queues of a single physical endpoint device.

15. The method of claim 1, wherein the enumeration packets emanate from a server.

16. The method of claim 15, wherein the server is arranged to run a plurality of virtual machines.

17. A non-transitory computer readable medium comprising computer readable instructions configured to cause a control device to:
    intercept enumeration packets directed to a physical network device hierarchy, the physical network device hierarchy comprising at least one network device and at least one physical endpoint device;

in response to intercepting the enumeration packets, transmit at least one response data packet to each of the enumeration packets, the at least one response data packet presenting a virtualized device hierarchy, the virtualized device hierarchy comprising at least one virtual network device and at least one virtual endpoint device;

transparently to the at least one physical endpoint device, store a mapping between an identifier of the at least one virtual endpoint device and a queue of the at least one physical endpoint device, each virtual endpoint device having an associated identifier;

receiving a data packet addressed to the at least one virtual endpoint device and having a return address for routing a response packet thereto; and prior to forwarding the data packet to the queue associated with the at least one physical endpoint device, modifying the return address of the data packet to be that of a physical address of an intercepting device.

18. An apparatus for providing identifiers for virtual devices in a network comprising:

a memory storing processor readable instructions; and a processor arranged to read and execute the processor readable instructions stored in the memory;

wherein the processor readable instructions comprise instructions arranged to control the apparatus to:

intercept enumeration packets directed to a physical network device hierarchy, the physical network device hierarchy comprising at least one network device and at least one physical endpoint device;

in response to intercepting the enumeration packets, transmit at least one response data packet to each of the enumeration packets, the at least one response data packet presenting a virtualized device hierarchy, the virtualized device hierarchy comprising at least one virtual network device and at least one virtual endpoint device;

transparently to the at least one physical endpoint device, store a mapping between an identifier of the at least one virtual endpoint device and a queue of the at least one physical endpoint device, each virtual endpoint device having an associated identifier;

receive a data packet addressed to the at least one virtual endpoint device and having a return address for routing a response packet thereto; and prior to forwarding the data packet to the queue associated with the at least one physical endpoint device, modify the return address of the data packet to be that of a physical address of an intercepting device.

19. The apparatus of claim 18, further comprising a switch to which the at least one physical endpoint device is at least indirectly connected;

wherein the processor readable instructions are arranged to cause the enumeration packets to be received at a control device connected to the switch, and for the at least one response data packet to be generated at the control device.

20. The apparatus of claim 19, wherein the processor readable instructions are arranged to cause the enumeration packets received at the switch to be redirected to the control device, and for an identifier of the at least one virtual network device and the identifier of the at least one virtual endpoint device to be provided by the control device.

* * * * *